C. A. FREDERICKS.
Speaking-Tubes.

No. 135,421. Patented Feb. 4, 1873.

UNITED STATES PATENT OFFICE.

CHRISTIAN A. FREDERICKS, OF NEW YORK, N. Y.

IMPROVEMENT IN SPEAKING-TUBES.

Specification forming part of Letters Patent No. 135,421, dated February 4, 1873.

*To all whom it may concern:*

Figure 1:
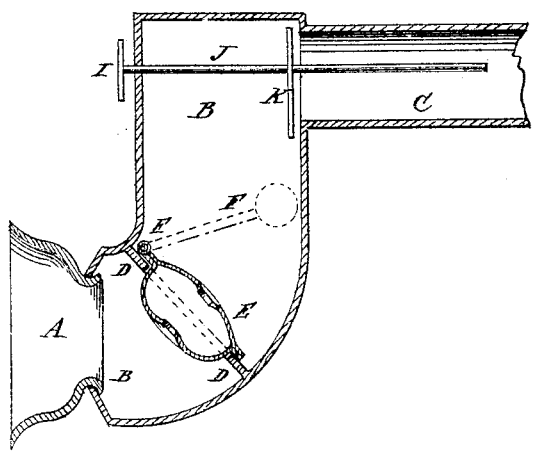
Figure 2:
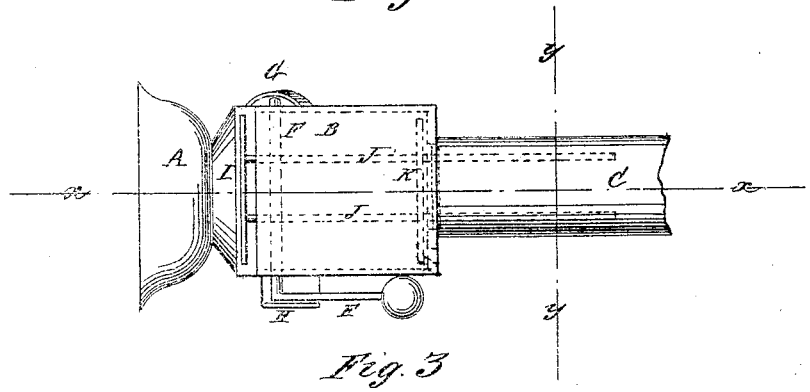
Figure 3:
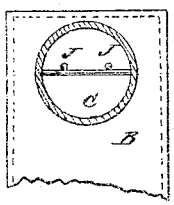

Be it known that I, CHRISTIAN A. FREDERICKS, of the city, county, and State of New York, have invented a new and useful Improvement in Speaking-Tubes, of which the following is a specification:

Figure 1 is a detail sectional view of a part of a speaking-tube illustrating my invention taken through the line $x\ x$, Fig. 2. Fig. 2 is a top view of the same. Fig. 3 is a detail section of the same taken through the line $y\ y$, Fig. 2.

Similar letters of reference indicate corresponding parts.

My invention has for its object to improve the construction of the part of speaking-tubes adjacent to the mouth-piece so as to make it more reliable in use and less liable to get out of order; and it consists in the arrangement of the valve in the valve-chamber; in the combination of the whistle with the valve, and of the guards with the valve-crank wire; and in the construction of the indicator, as hereinafter more fully described.

A represents the mouth-piece. B represents the chamber, to which the mouth-piece A is attached, in which the valve is placed, and with which the whistle is connected. C represents the body of the tube. D is the valve-seat, which is formed by attaching to the walls of the valve-chamber B the edges of a plate having a hole through its center of sufficient size for the free passage of the air. The seat D is placed in an inclined position, so that the valve E may be held down upon it by its own weight. The valve E, at its upper edge, is attached to a wire, F, which passes through and works in holes formed in the walls of the chamber B. One end of the wire F is bent into the form of a crank, to enable the valve E to be conveniently raised by it. The other end of the wire F rests against a guard, G, attached to the outer side of the valve-chamber B. The crank-end of the wire F rests against the guard H, attached to the crank-side of the valve-chamber B. The guards G H prevent any longitudinal movement of the wires F, and thus cause the valve E to always come down squarely upon its seat. The valve-seat D and valve E are represented as being arranged in an inclined position; but this is not essential so long as the said valve-seat and valve are so arranged that the valve may be held down to its seat by weight. The whistle may be formed in the valve E, and may, in fact, form said valve, as shown in Fig. 1. I is the indicator-plate, which is attached to the ends of two wires, J, which pass through holes in the upper part of the valve-chamber B, and to which, within said chamber, is attached a plate, K, in such a position as to cover the mouth of the pipe C when the indicator is pushed back, as shown in Fig. 1.

By this construction, when the other end of the tube is blown into the first effect is to push out the indicator, and then to sound the whistle.

The ends of the wires J pass into the pipe C, as shown in Figs. 2 and 3, and rest upon and are supported by a wire, L, passing across the inner end of said pipe C, as shown in Figs. 1 and 3.

Having thus described my invention, I claim as new and desire to secure by Letters Patent—

1. The indicator composed of the plate I, rods J J, and plate K, in combination with a speaking-tube, substantially as shown and described.

2. The arrangement of the indicator and valve in the L-shaped terminus of a speaking-tube, substantially as shown and described.

3. The guards G H, in combination with the shaft F, upon which is fixed the valve E, substantially as shown and described.

CHRISTIAN A. FREDERICKS.

Witnesses:
JAMES T. GRAHAM,
FRANK BLOCKLEY.